(12) United States Patent
Shin et al.

(10) Patent No.: US 8,650,302 B2
(45) Date of Patent: Feb. 11, 2014

(54) COMMUNICATION IN MULTIPROCESSOR USING PROXY SOCKETS

(75) Inventors: George Shin, Boise, ID (US); Richard Brame, Monument, CO (US); Michael Jacobson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 192 days.

(21) Appl. No.: 13/232,379

(22) Filed: Sep. 14, 2011

(65) Prior Publication Data
US 2012/0005349 A1 Jan. 5, 2012

Related U.S. Application Data

(62) Division of application No. 10/856,263, filed on May 27, 2004.

(51) Int. Cl.
*G06F 15/173* (2006.01)

(52) U.S. Cl.
USPC .......................................... 709/226; 709/223

(58) Field of Classification Search
USPC ........................................................ 709/226
See application file for complete search history.

(56) References Cited

U.S. PATENT DOCUMENTS

| | | | |
|---|---|---|---|
| 5,644,789 A | 7/1997 | Matthews et al. | |
| 5,657,390 A * | 8/1997 | Elgamal et al. ............... | 713/151 |
| 5,828,840 A | 10/1998 | Cowan et al. | |
| 5,867,660 A | 2/1999 | Schmidt et al. | |
| 5,931,917 A | 8/1999 | Nguyen et al. | |
| 5,964,891 A | 10/1999 | Caswell et al. | |
| 5,978,840 A | 11/1999 | Nguyen et al. | |
| 6,061,665 A | 5/2000 | Bahreman | |
| 6,076,113 A | 6/2000 | Ramanathan et al. | |
| 6,098,190 A | 8/2000 | Rust et al. | |
| 6,141,793 A | 10/2000 | Bryant et al. | |
| 6,163,797 A | 12/2000 | Eckley et al. | |
| 6,169,992 B1 | 1/2001 | Beall et al. | |
| 6,189,046 B1 | 2/2001 | Moore et al. | |
| 6,192,410 B1 | 2/2001 | Miller et al. | |
| 6,212,560 B1 | 4/2001 | Fairchild | |
| 6,230,240 B1 | 5/2001 | Shrader et al. | |
| 6,234,582 B1 | 5/2001 | Wu | |
| 6,334,056 B1 | 12/2001 | Holmes et al. | |
| 6,397,245 B1 | 5/2002 | Johnson, II et al. | |
| 6,438,597 B1 | 8/2002 | Mosberger et al. | |
| 6,477,139 B1 | 11/2002 | Anderson et al. | |
| 6,549,956 B1 | 4/2003 | Bass et al. | |
| 6,553,422 B1 | 4/2003 | Nelson | |
| 6,584,567 B1 | 6/2003 | Bellwood et al. | |
| 6,600,967 B2 | 7/2003 | Milligan et al. | |
| 6,640,278 B1 | 10/2003 | Nolan et al. | |
| 6,718,388 B1 * | 4/2004 | Yarborough et al. ......... | 709/227 |
| 6,754,831 B2 | 6/2004 | Brownell | |
| 7,032,005 B2 | 4/2006 | Mathon et al. | |
| 7,263,701 B2 | 8/2007 | Yun | |
| 7,296,154 B2 * | 11/2007 | Evans et al. ................... | 713/169 |
| 7,380,024 B2 | 5/2008 | Peterson et al. | |

(Continued)

Primary Examiner — Minh-Chau Nguyen

(57) ABSTRACT

Systems and methods for implementing communication in a multiprocessor are disclosed. In one exemplary implementation a first processor receives a request to provide a communication resource for an application executing on the first processor to communicate with a remote application. In response to the communication request, the first processor opens a communication resource on a second processor, and manages communication operations between the application executing on the first processor and the remote application using the communication resource on the second processor.

20 Claims, 12 Drawing Sheets

(56) References Cited

U.S. PATENT DOCUMENTS

| | | | |
|---|---|---|---|
| 7,406,709 B2 | 7/2008 | Maher et al. | |
| 7,581,006 B1 | 8/2009 | Lara et al. | |
| 7,594,230 B2 | 9/2009 | Delly et al. | |
| 7,676,788 B1 | 3/2010 | Ousterhout et al. | |
| 7,774,375 B2 * | 8/2010 | Rudolph et al. | 707/802 |
| 7,802,001 B1 | 9/2010 | Petry et al. | |
| 2001/0042131 A1 | 11/2001 | Mathon et al. | |
| 2002/0032780 A1 | 3/2002 | Moore et al. | |
| 2002/0078135 A1 * | 6/2002 | Venkatsubra | 709/202 |
| 2002/0111996 A1 * | 8/2002 | Jones et al. | 709/203 |
| 2002/0194292 A1 | 12/2002 | King | |
| 2003/0055943 A1 | 3/2003 | Kanai | |
| 2003/0088683 A1 | 5/2003 | Kitamura et al. | |
| 2003/0120386 A1 | 6/2003 | Milligan et al. | |
| 2003/0149770 A1 | 8/2003 | Delaire et al. | |
| 2003/0154306 A1 | 8/2003 | Perry | |
| 2003/0165160 A1 | 9/2003 | Minami et al. | |
| 2003/0182464 A1 | 9/2003 | Hamilton et al. | |
| 2004/0157557 A1 * | 8/2004 | Barnett et al. | 455/41.2 |
| 2004/0264383 A1 * | 12/2004 | Rudolph et al. | 370/252 |
| 2004/0267935 A1 | 12/2004 | Patiejunas | |
| 2005/0165932 A1 * | 7/2005 | Banerjee et al. | 709/226 |
| 2005/0229184 A1 * | 10/2005 | Inoue et al. | 719/310 |

* cited by examiner

COMMUNICATION IN MULTIPROCESSOR USING PROXY SOCKETS

CROSS-REFERENCE TO RELATED APPLICATION

This application is a divisional of co-pending U.S. patent application Ser. No. 10/856,263, filed May 27, 2004, the entire contents of which are hereby incorporated by reference as though fully set forth herein.

TECHNICAL FIELD

The described subject matter relates to electronic computing, and more particularly to systems and methods for implementing proxy sockets to facilitate communication in a multiprocessor computing system.

BACKGROUND

In multiprocessor computing systems, each processor is capable of managing its own network connectivity operations. In such a configuration, each physical network interface is bound only to the local communication stack in the multiprocessor system. A communication stack that is not bound to a particular network interface does not have direct access to the data link layer supplied by that interface.

Thus, an application-level service may find that not all network interfaces in a multiprocessor environment are available for establishing a communication endpoint because the local network stack cannot bind to all of the interfaces in the multi-processor system. In other words, not all of the network interfaces are available to all application layer services present in a multi-processor system.

One way to address this issue is to pair application-level services with specific local network interfaces, i.e., to dedicate local network interfaces to specific applications or task. However, dedicating services only to specific local network interfaces impairs the scalability of the system. Accordingly, additional solutions are desirable.

SUMMARY

Systems and methods described herein address these issues by enabling multiprocessor communication using proxy sockets. In one exemplary implementation a first processor receives a request to provide a communication resource for an application executing on the first processor to communicate with a remote application. In response to the communication request, the first processor opens a communication resource on a second processor, and implements communication operations between the application executing on the first processor and the remote application using the communication resource on the second processor.

DETAILED DESCRIPTION

Described herein are exemplary architectures and techniques for implementing proxy sockets in a multi-processor computing system. The methods described herein may be embodied as logic instructions on a computer-readable medium, firmware, or as dedicated circuitry. When executed on a processor, the logic instructions (or firmware) cause a processor to be programmed as a special-purpose machine that implements the described methods. The processor, when configured by the logic instructions (or firmware) to execute the methods recited herein, constitutes structure for performing the described methods.

Exemplary Storage Architecture

Figure 1:
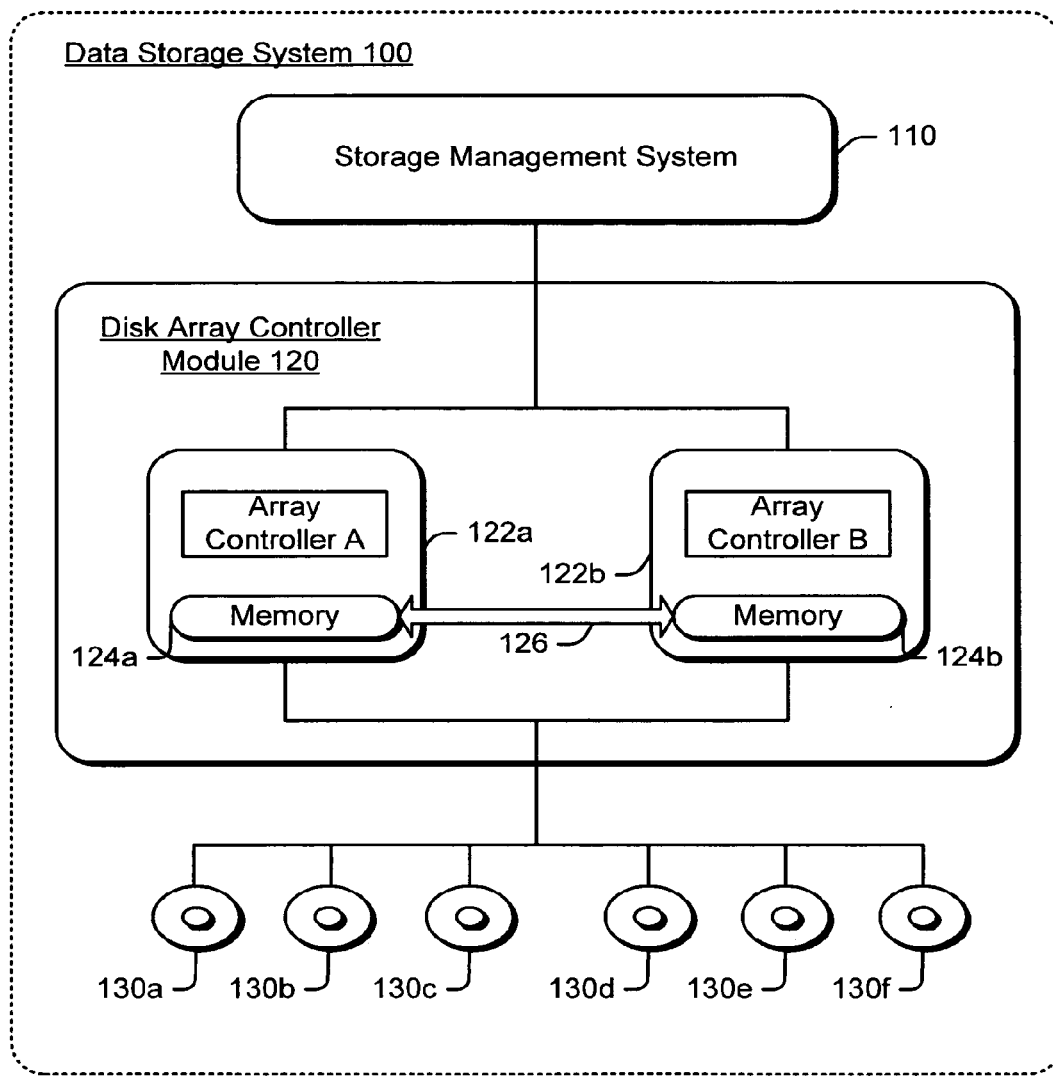
FIG. 1 is a schematic illustration of an exemplary implementation of a data storage system that implements RAID storage.

FIG. 1 is a schematic illustration of an exemplary implementation of a data storage system 100. The data storage system 100 has a disk array with multiple storage disks 130*a*-130*f*, a disk array controller module 120, and a storage management system 110. The disk array controller module 120 is coupled to multiple storage disks 130*a*-130*f* via one or more interface buses, such as a small computer system interface (SCSI) bus. The storage management system 110 is coupled to the disk array controller module 120 via one or more interface buses. It is noted that the storage management system 110 can be embodied as a separate component (as shown), or within the disk array controller module 120, or within a host computer.

In an exemplary implementation data storage system 100 may implement RAID (Redundant Array of Independent Disks) data storage techniques. RAID storage systems are disk array systems in which part of the physical storage capacity is used to store redundant data. RAID systems are typically characterized as one of six architectures, enumerated under the acronym RAID. A RAID 0 architecture is a disk array system that is configured without any redundancy. Since this architecture is really not a redundant architecture, RAID 0 is often omitted from a discussion of RAID systems.

A RAID 1 architecture involves storage disks configured according to mirror redundancy. Original data is stored on one set of disks and a duplicate copy of the data is kept on separate disks. The RAID 2 through RAID 5 architectures involve parity-type redundant storage. Of particular interest, a RAID 5 system distributes data and parity information across a plurality of the disks 130*a*-130*c*. Typically, the disks are divided into equally sized address areas referred to as "blocks". A set of blocks from each disk that have the same unit address ranges are referred to as "stripes". In RAID 5, each stripe has N blocks of data and one parity block which contains redundant information for the data in the N blocks.

In RAID 5, the parity block is cycled across different disks from stripe-to-stripe. For example, in a RAID 5 system having five disks, the parity block for the first stripe might be on the fifth disk; the parity block for the second stripe might be on the fourth disk; the parity block for the third stripe might be on the third disk; and so on. The parity block for succeeding stripes typically rotates around the disk drives in a helical pattern (although other patterns are possible). RAID 2 through RAID 4 architectures differ from RAID 5 in how they compute and place the parity block on the disks. The particular RAID class implemented is not important.

In a RAID implementation, the storage management system 110 optionally may be implemented as a RAID management software module that runs on a processing unit of the data storage device, or on the processor unit of a computer. The disk array controller module 120 coordinates data transfer to and from the multiple storage disks 130a-130f. In an exemplary implementation, the disk array module 120 has two identical controllers or controller boards: a first disk array controller 122a and a second disk array controller 122b. Parallel controllers enhance reliability by providing continuous backup and redundancy in the event that one controller becomes inoperable. Parallel controllers 122a and 122b have respective mirrored memories 124a and 124b. The mirrored memories 124a and 124b may be implemented as battery-backed, non-volatile RAMs (e.g., NVRAMs). Although only dual controllers 122a and 122b are shown and discussed generally herein, aspects of this invention can be extended to other multi-controller configurations where more than two controllers are employed.

The mirrored memories 124a and 124b store several types of information. The mirrored memories 124a and 124b maintain duplicate copies of a coherent memory map of the storage space in multiple storage disks 130a-130f. This memory map tracks where data and redundancy information are stored on the disks, and where available free space is located. The view of the mirrored memories is consistent across the hot-plug interface, appearing the same to external processes seeking to read or write data.

The mirrored memories 124a and 124b also maintain a read cache that holds data being read from the multiple storage disks 130a-130f. Every read request is shared between the controllers. The mirrored memories 124a and 124b further maintain two duplicate copies of a write cache. Each write cache temporarily stores data before it is written out to the multiple storage disks 130a-130f.

The controller's mirrored memories 122a and 122b are physically coupled via a hot-plug interface 126. Generally, the controllers 122a and 122b monitor data transfers between them to ensure that data is accurately transferred and that transaction ordering is preserved (e.g., read/write ordering).

Figure 2:
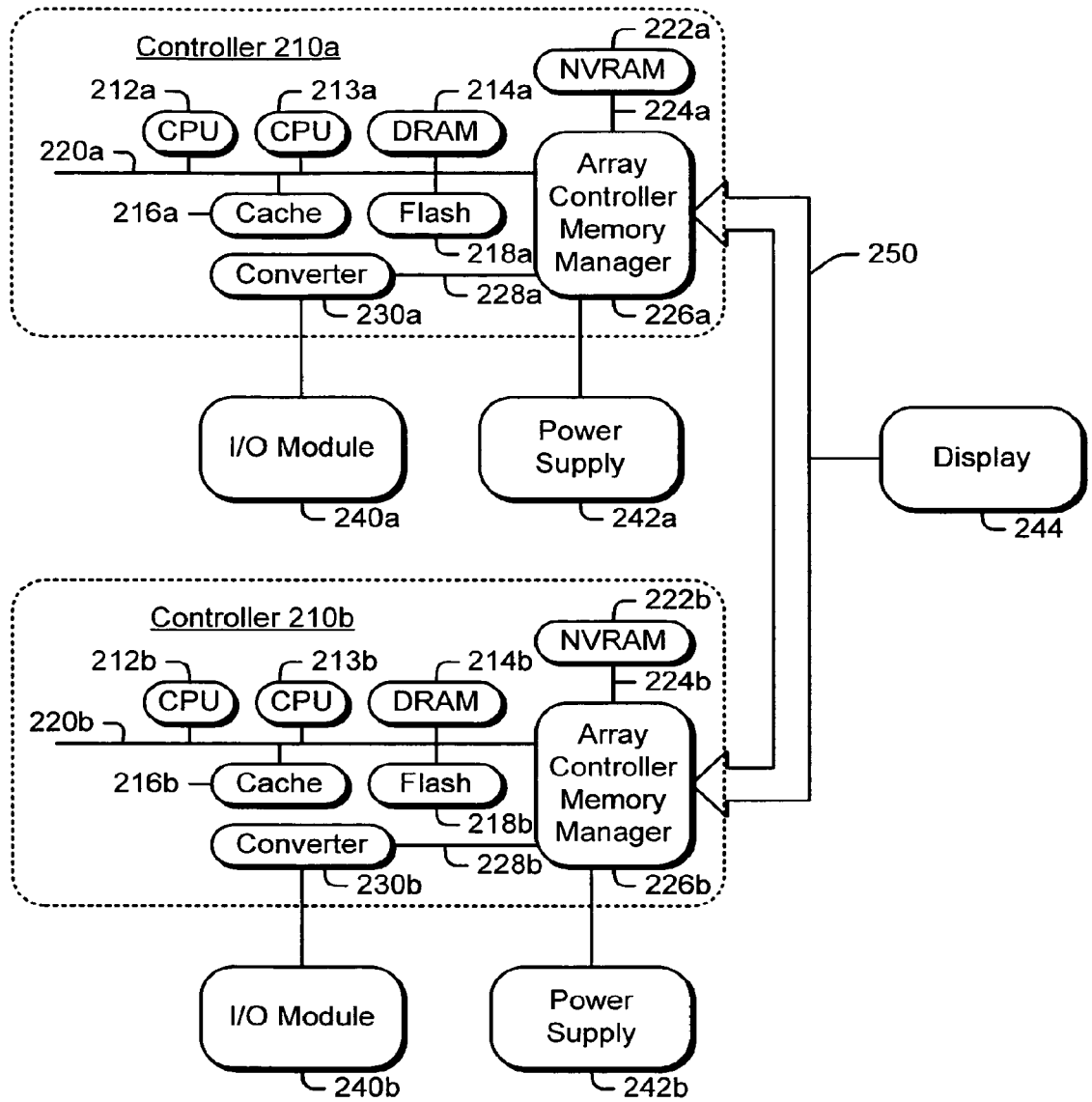
FIG. 2 is a schematic illustration of an exemplary implementation of a RAID controller in more detail.

FIG. 2 is a schematic illustration of an exemplary implementation of a dual RAID controller in greater detail. In addition to controller boards 210a and 210b, the disk array controller also has two I/O modules 240a and 240b, an optional display 244, and two power supplies 242a and 242b. The I/O modules 240a and 240b facilitate data transfer between respective controllers 210a and 210b and one or more host computers. In one implementation, the I/O modules 240a and 240b employ fiber channel technology, although other bus technologies may be used. The power supplies 242a and 242b provide power to the other components in the respective disk array controllers 210a, 210b, the display 244, and the I/O modules 240a, 240b.

Each controller 210a, 210b has a converter 230a, 230b connected to receive signals from the host via respective I/O modules 240a, 240b. Each converter 230a and 230b converts the signals from one bus format (e.g., Fibre Channel) to another bus format (e.g., peripheral component interconnect (PCI)). A first PCI bus 228a, 228b carries the signals to an array controller memory transaction manager 226a, 226b, which handles all mirrored memory transaction traffic to and from the NVRAM 222a, 222b in the mirrored controller. The array controller memory transaction manager maintains the memory map, computes parity, and facilitates cross-communication with the other controller. The array controller memory transaction manager 226a, 226b is preferably implemented as an integrated circuit (IC), such as an application-specific integrated circuit (ASIC).

The array controller memory transaction manager 226a, 226b is coupled to the NVRAM 222a, 222b via a high-speed bus 224a, 224b and to other processing and memory components via a second PCI bus 220a, 220b. Controllers 210a, 210b may include several types of memory connected to the PCI bus 220a and 220b. The memory includes a dynamic RAM (DRAM) 214a, 214b, flash memory 218a, 218b, and cache 216a, 216b.

The array controller memory transaction managers 226a and 226b are coupled to one another via a communication interface 250. The communication interface 250 supports bi-directional parallel communication between the two array controller memory transaction managers 226a and 226b at a data transfer rate commensurate with the NVRAM buses 224a and 224b.

The array controller memory transaction managers 226a and 226b employ a high-level packet protocol to exchange transactions in packets over hot-plug interface 250. The array controller memory transaction managers 226a and 226b perform error correction on the packets to ensure that the data is correctly transferred between the controllers.

The array controller memory transaction managers 226a and 226b provide a memory image that is coherent across the hot plug interface 250. The managers 226a and 226b also provide an ordering mechanism to support an ordered interface that ensures proper sequencing of memory transactions.

In an exemplary implementation each controller 210a, 210b includes multiple central processing units (CPUs) 212a, 213a, 212b, 213b, also referred to as processors. The processors on each controller may be assigned specific functionality to manage. For example, a first set of processing units 212a, 212b may manage storage operations for the plurality of disks 130a-130f, while a second set of processing units 213a, 213b may manage networking operations with host computers or other devices that request storage services from data storage system 100.

Separating networking operations from storage operations and assigning the networking operations to a separate processor can improve the performance of a storage controller. Computationally-expensive networking operations can be off-loaded to a co-processor, thereby permitting the main processor to dedicate its processor cycles to storage operations.

Figure 3:
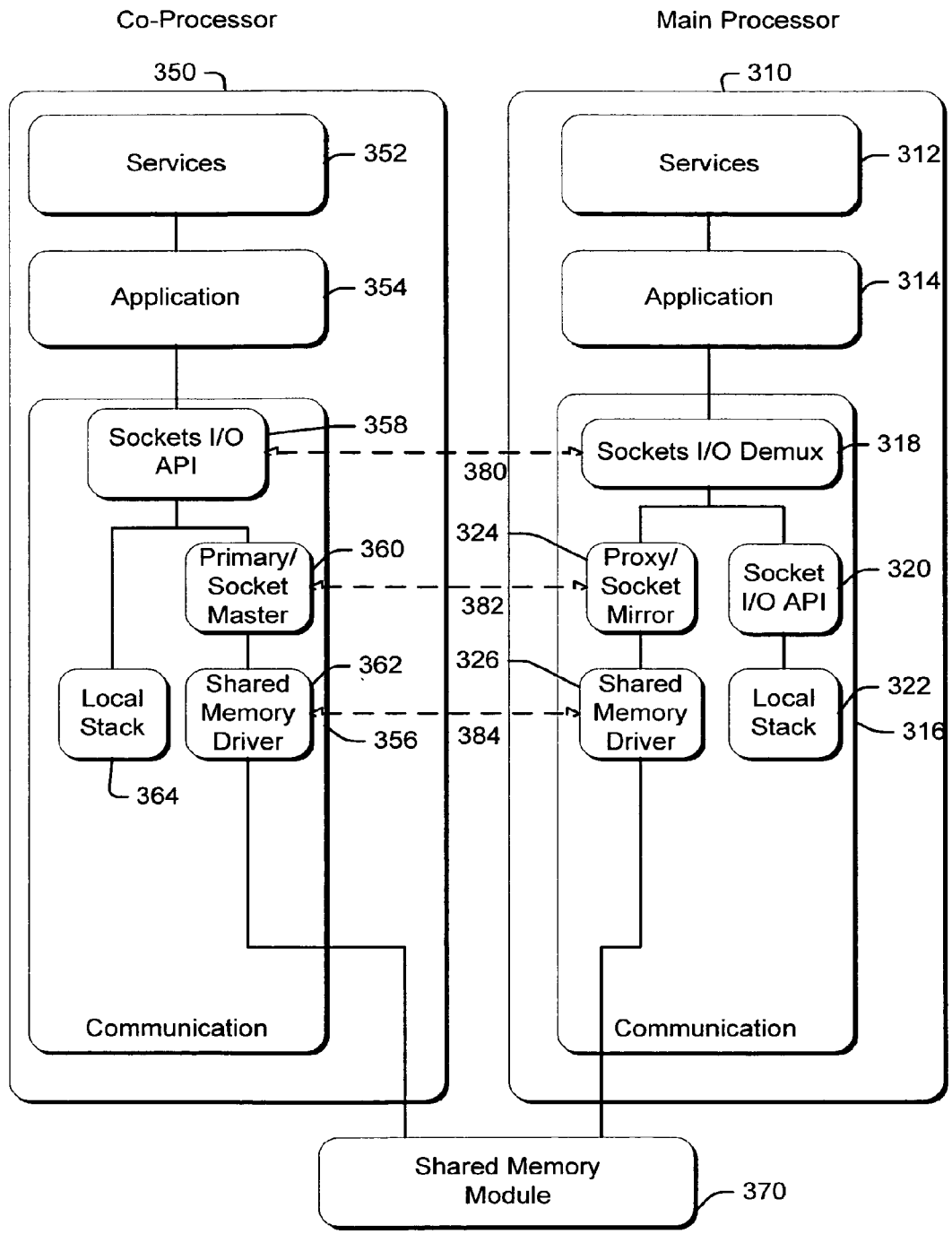
FIG. 3 is a schematic illustration of an exemplary multiprocessor communication architecture.

In such a multi-processor architecture, each processor side may implement its own software protocol stack for communication purposes. FIG. 3 is a schematic illustration of a multiprocessor communication configuration. In one exemplary implementation the multiprocessor configuration depicted in FIG. 3 may be implemented in storage controller such as, e.g., the storage controller depicted in FIG. 2. The multiprocessor configuration comprises a first processor, i.e., the main processor 310 and a second processor, i.e., the co-processor 350. The main processor 310 manages data I/O operations to and from the plurality of disks 130a-130f, while the co-processor 350 manages network operations.

Main processor 310 comprises a services module 312 that provides one or more services to a management network by invoking one or more applications in application module 314. Application module 314 invokes a communication module 316 to pass service protocol data units (PDUs) down the protocol stack. Communication module 316 includes a sockets I/O demultiplexer module 318, a socket I/O API module 320, a local communication protocol stack 322, a proxy/socket mirror module 324, and a shared memory driver module 326. The various modules in communication module 316 may be implemented as software objects that facilitate transmitting and receiving service PDUs with other objects in an attached management network. Operation of these modules will be explained in greater detail below.

Co-processor 350 also comprises a services module 352 that provides one or more services via a storage attached network by invoking one or more applications in application module 354. Application module 354 invokes a communication module 356 to pass service PDUs down the protocol stack. Communication module 356 includes a sockets I/O API 358, a primary/socket master module 360, a shared memory driver module 362, and a local network protocol module 364. The various modules in communication module may be implemented as software objects that facilitate transmitting and receiving service PDUs with other object in an attached network. Operation of these modules will be explained in greater detail below.

In an exemplary implementation, main processor 310 communicates with co-processor 350 logically at the sockets I/O demultiplexer 318 and the sockets I/O API 358 level using conventional sockets-based communications techniques that rely on underlying remote procedure call (RPC) between proxy/socket mirror 324 and primary/socket master 360. This communication depends on the lower-level communication layer between shared memory drivers 326, 362, which is implemented by shared memory function calls (SMFC). Sockets I/O demultiplexer 318 implements operations that permit the main processor to send and receive communication with external devices using a proxy socket it manages (the co-processor plays part in this managed or proxy socket by offering server-side RPCs for socket APIs called by main processor).

Connection 380 illustrates a logical link between the sockets I/O demultiplexer 318 and the sockets I/O API on co-processor 358 where main processor 310 connects to 358 via the proxy module. Connection 382 illustrates a logical link between the proxy/socket mirror module 324 and the primary/socket master module 360 where 324 connects to this link as client side RPC and 360 connects to this link as server side RPC. Connection 384 illustrates a logical link between shared memory drivers 326 and 362 where this link implements the IPC (Inter-Processor Communication) using SMFCs through 370. The data path from 318 through 324 and 326 which is the proxy/socket mirror path leads to managed sockets through the use of proxy module in 310. The data path from 318 through 320 and 322 which is the conventional socket I/O API path leads to unmanaged sockets through the use of master module in 310.

Operation of an exemplary sockets I/O demultiplexer 318 will be described with reference to the flowcharts of FIGS. 4A-4B, FIG. 5, and the data tables of FIG. 6.

Exemplary Operations

Figure 4A:
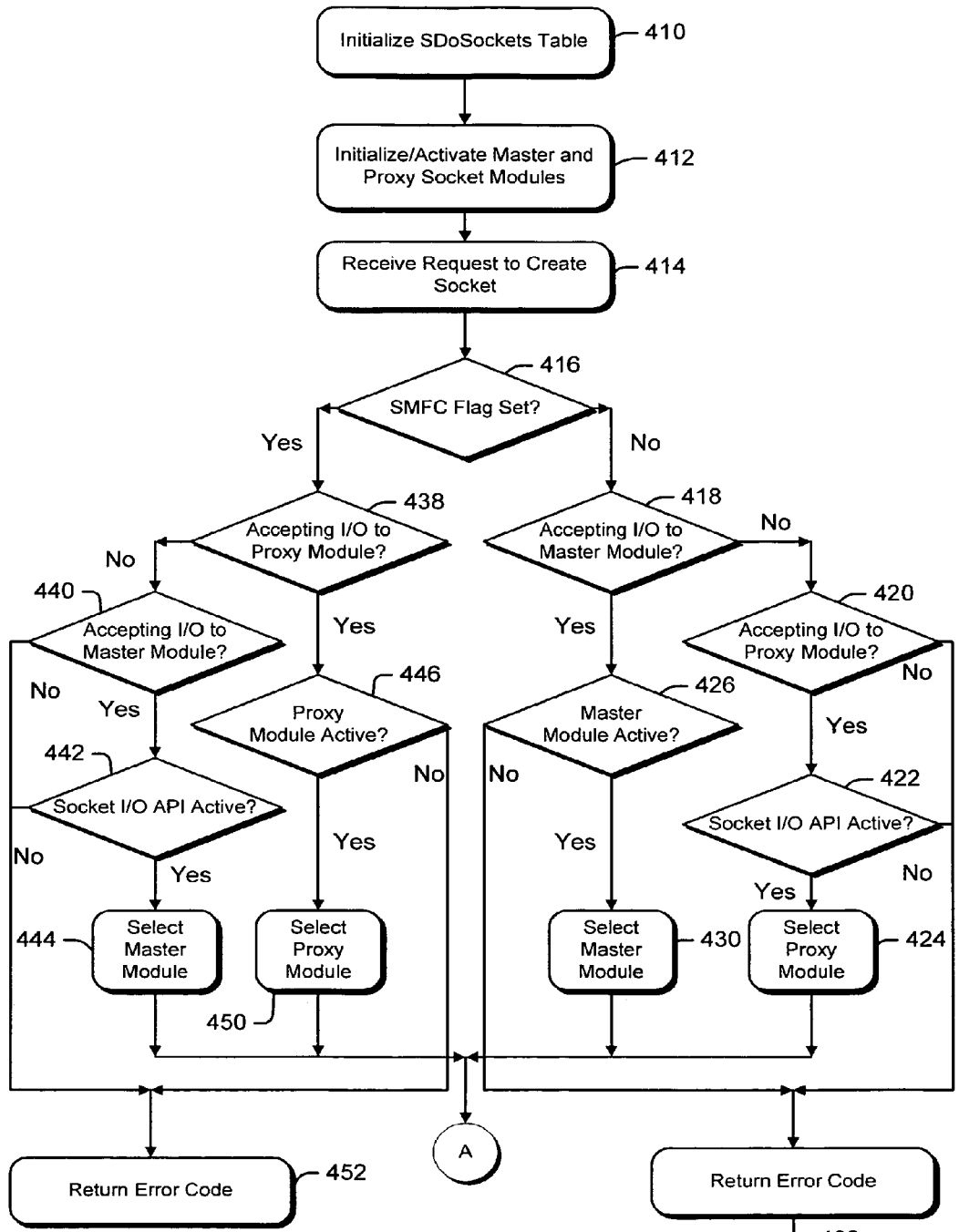
FIGS. 4A-4B are flowcharts illustrating operations in an exemplary method for creating a socket for communication in a multiprocessor system.
Figure 4B:
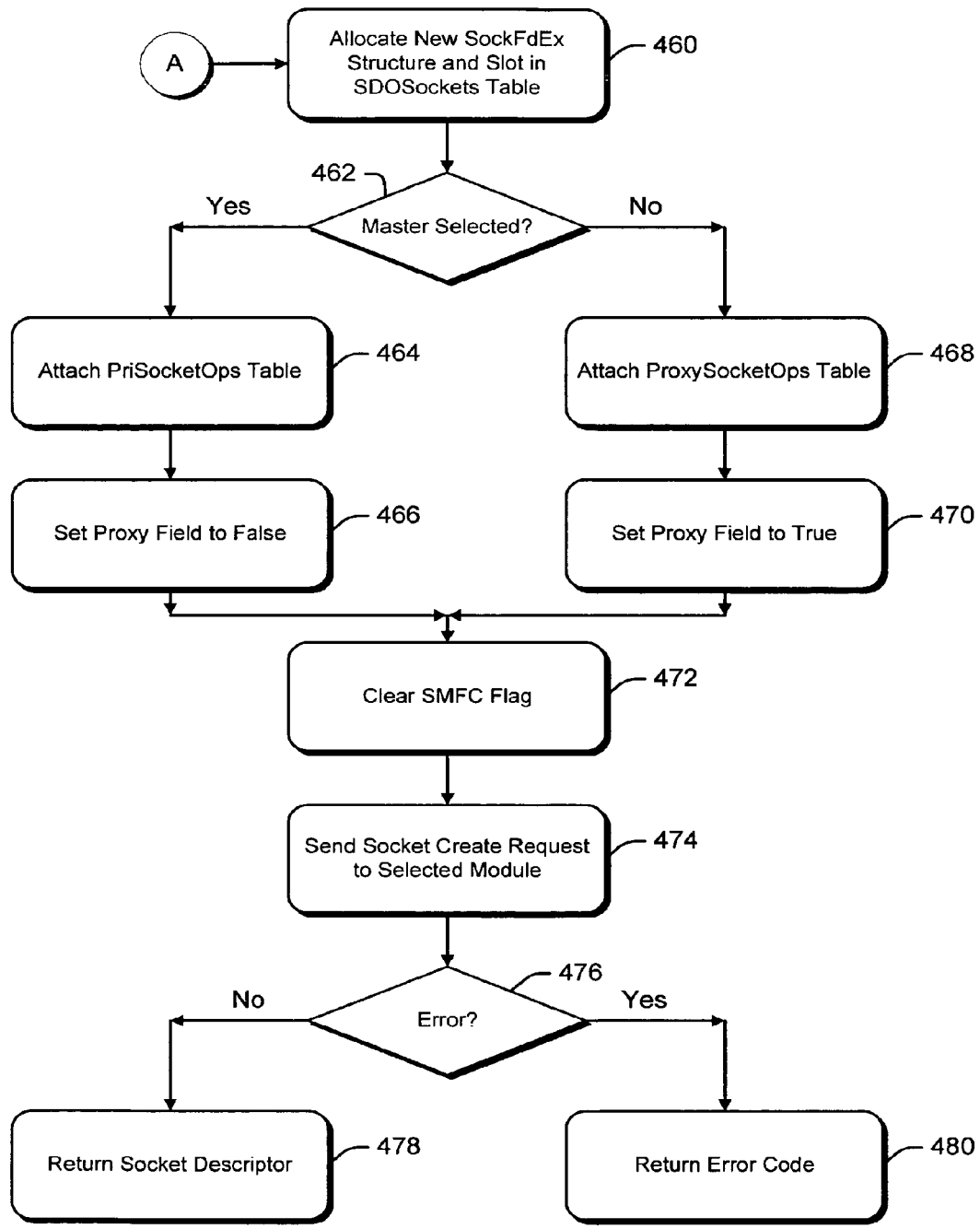

FIGS. 4A-4B illustrate an exemplary process implemented by the sockets I/O demultiplexer 318 to create a socket. The process illustrated in FIG. 4a is concerned with selecting either a master module or a proxy module for communication by the main processor 310. FIG. 4a assumes that an application in application module 314 has been invoked and needs to create an endpoint for communication with one or more external devices. At operation 410 the sockets I/O demultiplexer 318 initializes a data table referred to herein as the SdOSockets table 610, which is depicted in FIG. 6. The application module 314 passes the conventional socket API based communication request to the socket I/O demultiplexer 318, Referring briefly to FIG. 6 the SdOSockets table 610 is a data structure that can include as many entries as are required by applications. Each entry in the SdOSockets table 610 includes a pointer to a separate instance of a data structure referred to herein as a SockFdEx data structure 615a, 615b. Referring to SockFdEx data structures 615a, 615b the SockFdEx data structure includes a SOps pointer 620a, 620b, a proxy flag data field 622a, 622b and a SockFd field 624a, 624b. The SOps pointer points to one of two data structures: the ProxySocketOps data structure 640 or the PriSocketOps data structure 660. The proxy flag data field holds a data flag that indicates whether the socket represented by the particular instance of the SockFdEx data structure is a proxy socket. The SockFd field holds the socket handle as returned by the underlying Socket I/O API 320, 358.

The ProxySocketOps data structure 640 includes entry points into application programming interfaces (APIs) for performing various socket operations. By way of example, the ecs_proxy_socket entry 642 provides an entry into an API that creates a proxy socket, the ecs_proxy_bind entry 644 provides an entry into an API that binds a proxy socket, the ecs_proxy_listen entry 646 provides an entry into an API that transforms a proxy socket into a listening socket. One skilled in the art will recognize the remaining socket operations in the ProxySocketOps table.

Similarly, the PriSocketOps table data structure 660 includes entry points into application programming interfaces (APIs) for performing various socket operations. By way of example, the ecs_socket entry 662 provides an entry into an API that creates a primary socket, the ecs_bind entry 664 provides an entry into an API that binds a primary socket, the ecs_listen entry 666 provides an entry into an API that transforms a primary socket into a listening socket. One skilled in the art will recognize the remaining socket operations in the PriSocketOps table.

Referring again to FIG. 4a, at operation 412 the sockets I/O demultiplexer 318 initializes and activates the master module and the proxy module. The term master module refers to the library of functions that enable communication using the communication stack on the main processor 310. The term proxy module refers to the library of services that permit communication with applications on the main processor 310 via the communication stack on the co-processor 350. In an exemplary implementation, the proxy module is implemented as client-server software (or firmware) that communicates via shared memory inter-process communication (IPC) calls. The client-side software resides in the main processor 310 and the server-side software resides in the co-processor 350.

At operation 416 the sockets I/O demultiplexer 318 determines whether the request includes a proxy flag that is set. In an exemplary implementation the proxy flag is implemented in a protocol parameter, specifically, a shared memory function call (SMFC) flag is passed to the demultiplexer with the socket request.

If the proxy flag is not set, then control passes to operation 418, and the sockets I/O demultiplexer 318 determines whether it can accept socket I/O to the socket I/O API 320 in the main processor 310. If it can accept socket I/O to the socket I/O API 320 then control passes to operation 426, and the sockets I/O demultiplexer 318 determines whether the socket I/O API 320 is active (or initialized properly and ready). If the socket I/O API 320 is active, then control passes to operation 430 and the sockets I/O demultiplexer 318 selects the master module. By contrast, if the socket I/O API 320 is inactive, then control passes to operation 432 and an error code is returned to the calling routine.

Referring back to operation 418, if the sockets I/O demultiplexer 318 cannot accept socket I/O to the socket I/O API 320 in the main processor 310, then control passes to operation 420, and the sockets I/O demultiplexer 318 determines whether it can accept sockets I/O communication to the proxy module. If so, then control passes to operation 422, and if the socket I/O API 358 is active, then the proxy module is selected for communication at operation 424. By contrast, if either of the tests implemented at operations 420 or 422 fail, then control passes to operation 432, and an error code is returned to the calling routine.

Referring back to operation 416, if the SMFC flag is set, then control passes to operation 438 and the sockets I/O demultiplexer 318 determines whether it can accept socket I/O to the socket I/O API 358 in the co-processor 350. If it can accept socket I/O to the socket I/O API 358 then control passes to operation 446, and the sockets I/O demultiplexer 318 determines whether the socket I/O API 358 is active. If the socket I/O API 358 is active, then control passes to operation 450 and the sockets I/O demultiplexer 318 selects the proxy module. By contrast, if the socket I/O API 358 is inactive, then control passes to operation 452 and an error code is returned to the calling routine.

Referring back to operation 438, if the sockets I/O demultiplexer 318 cannot accept socket I/O to the socket I/O API 358 in the co-processor 350, then control passes to operation 440, and the sockets I/O demultiplexer 318 determines whether it can accept sockets I/O communication to the master module. If so, then control passes to operation 442, and if the socket I/O API 320 is active, then the master module is selected for communication at operation 444. By contrast, if either of the tests implemented at operations 440 or 442 fail, then control passes to operation 452, and an error code is returned to the calling routine.

After the sockets I/O demultiplexer 318 has selected either the proxy module or the master module for communication, control passes to operation 460 (FIG. 4B) and the sockets I/O demultiplexer 318 allocates a new SockFdEx data structure and points to it from the SdOSockets table 610. If at operation 462 the master module is selected, then control passes to operation 464 and the sockets I/O demultiplexer 318 attaches a PriSocketOps structure 660 to the newly-created SockFdEx structure, e.g., by setting a pointer SOps in the SockFdEx structure to point to the PriSocketOps table. Referring to FIG. 6, this is illustrated by the SockFdEx structure 615b, in which the pointer SOps$_2$ is set to point to the PriSocketOps table 660. In addition, the proxy field in the SockFdEx table 615b is set to a value that indicates "false" (operation 466).

By contrast, if at operation 462 the master module is not selected then control passes to operation 468 and the sockets I/O demultiplexer 318 attaches a ProxySocketOps structure to 640 to the newly-created SockFdEx structure, e.g., by setting a pointer SOps in the SockFdEx structure to point to the ProxySocketOps table. Referring to FIG. 6, this is illustrated by the SockFdEx structure 615a, in which the pointer SOps$_1$ is set to point to the ProxySocketOps table 640. In addition, the proxy field in the SockFdEx table 615a is set to a value that indicates "true" (operation 470).

Control then passes to optional operation 472, in which the SMFC flag is cleared from "protocol" actual argument prior to reusing it in reissuing call to socket( ) API. At operation 474 the sockets I/O demultiplexer 318 sends a socket create request to the selected communication module, i.e., either the proxy module or the master module. If an error is returned (operation 476) then at operation 480 an error code is returned to the calling module. By contrast, if an error code is not returned at operation 480, then a socket descriptor is returned at operation 478.

Figure 5:
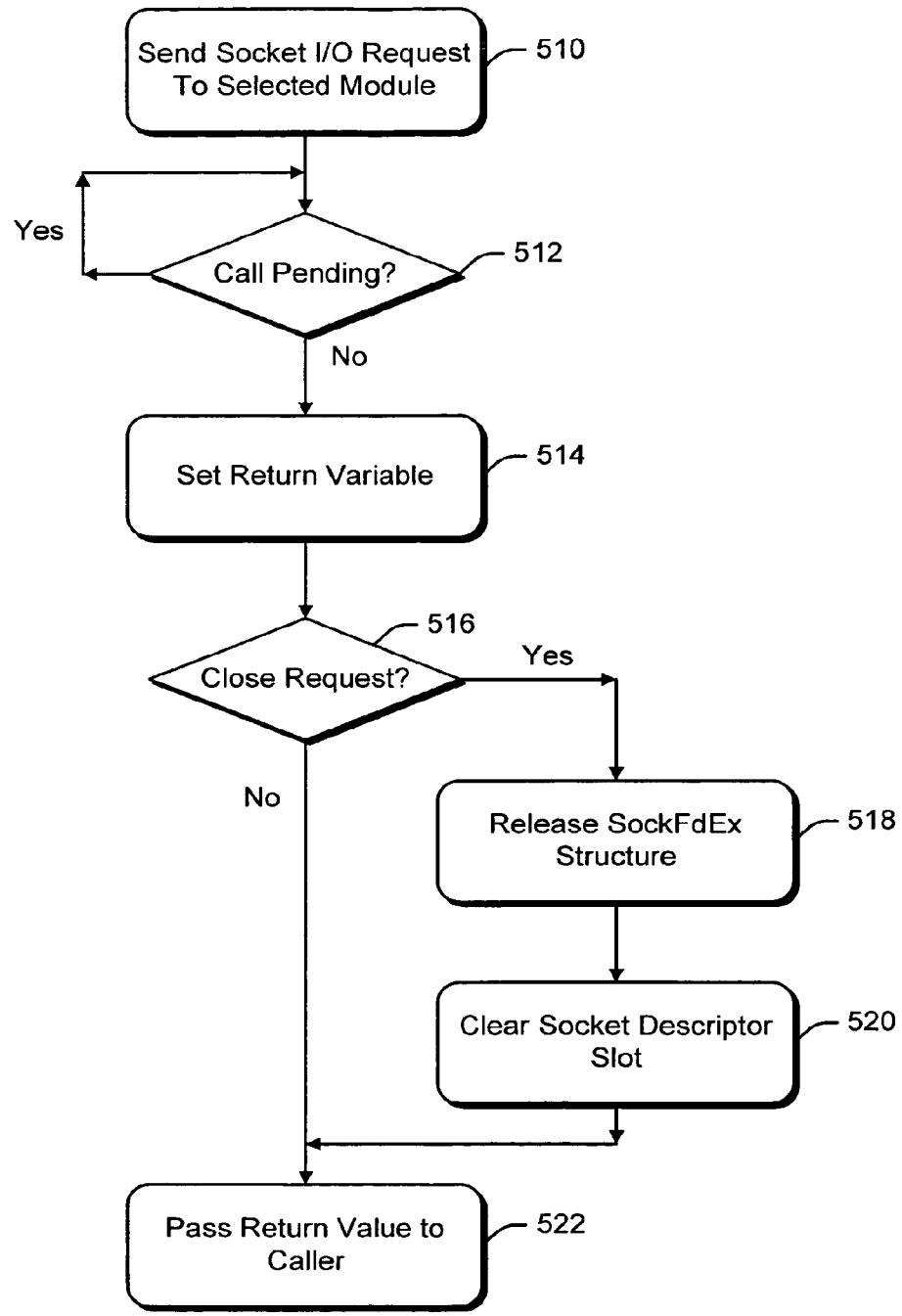
FIG. 5 is a flowchart illustrating additional exemplary socket operations.
Figure 6:
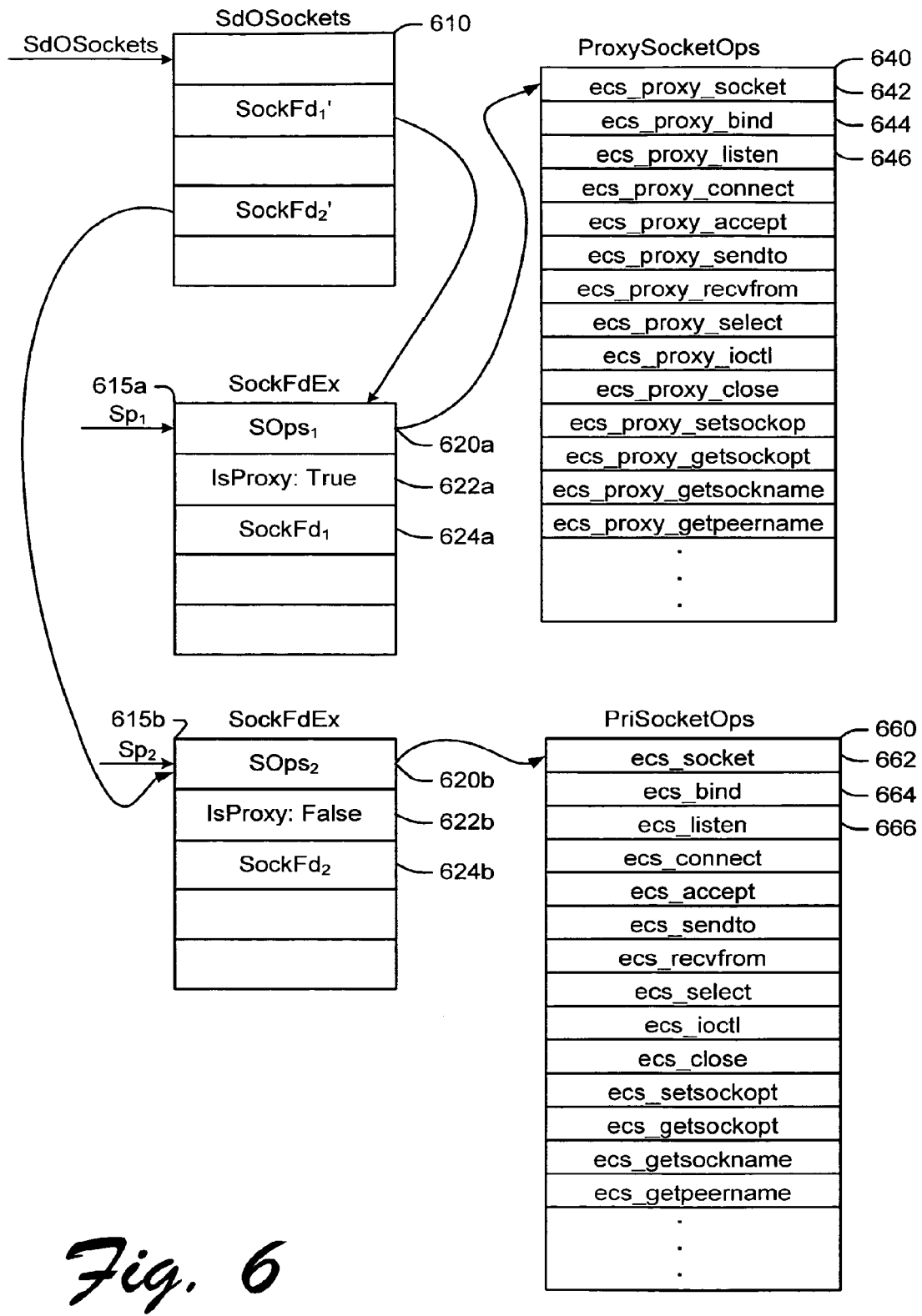
FIG. 6 is schematic illustration of exemplary data structures for managing proxy socket based multi-processor communication.

FIG. 5 is a flowchart illustrating additional exemplary socket I/O operations that may be implemented by the sockets I/O demultiplexer 318. The operations of FIG. 5 are exemplary for socket I/O requests other than requests to create a socket. The operations illustrated in FIG. 5 assume that the sockets I/O demultiplexer 318 has received a network I/O request addressed to a socket under its management.

At operation 510 the sockets I/O demultiplexer 318 sends a socket I/O request to a selected module, i.e., the proxy module or the master module. In an exemplary implementation operation 510 may be performed by selecting a socket operation that corresponds to the network I/O request in the SocketOps structure that corresponds to the selected module. By way of example, if the network I/O request involves a bind operation and the master module is the selected module, then the sockets I/O demultiplexer 318 would select the ecs_bind operation 664 in the PriSocketOps table 660. Similarly, if the network I/O request involves a bind operation and the proxy module is the selected module, then the sockets I/O demultiplexer 318 would select the ecs_proxy_bind operation 644 in the ProxySocketOps table 640. Hence, the data tables of FIG. 6 provide a mechanism for the sockets I/O demultiplexer 318 to map network I/O requests to socket operations for either the master module or the proxy module. One skilled in the art will recognize that the sockets I/O demultiplexer 318 can match the network I/O request to a corresponding socket operation in either the ProxySocketOps table 640 or the PriSocketOps table 660.

At optional operation 512 the sockets I/O demultiplexer 318 determines whether the call is still pending. If the call is still pending, then the sockets I/O demultiplexer 318 implements a loop that waits for the call to return. Once the call returns, control may pass to operation 514, where the sockets I/O demultiplexer 318 sets a return variable to the value returned by the call to the selected module, i.e., either the proxy module or the master module.

If, at operation 516, the network I/O call was a request to close a socket, then control passes first to operation 518, where the sockets I/O demultiplexer 318 releases the SockFdEx data structure assigned to the socket, then to operation 520, where the sockets I/O demultiplexer 318 clears the socket descriptor slot from the SdOSockets table 610.

Control then passes to operation 522, and the sockets I/O demultiplexer 318 passes the return value to the module that invoked the socket I/O API function call.

Figure 7:
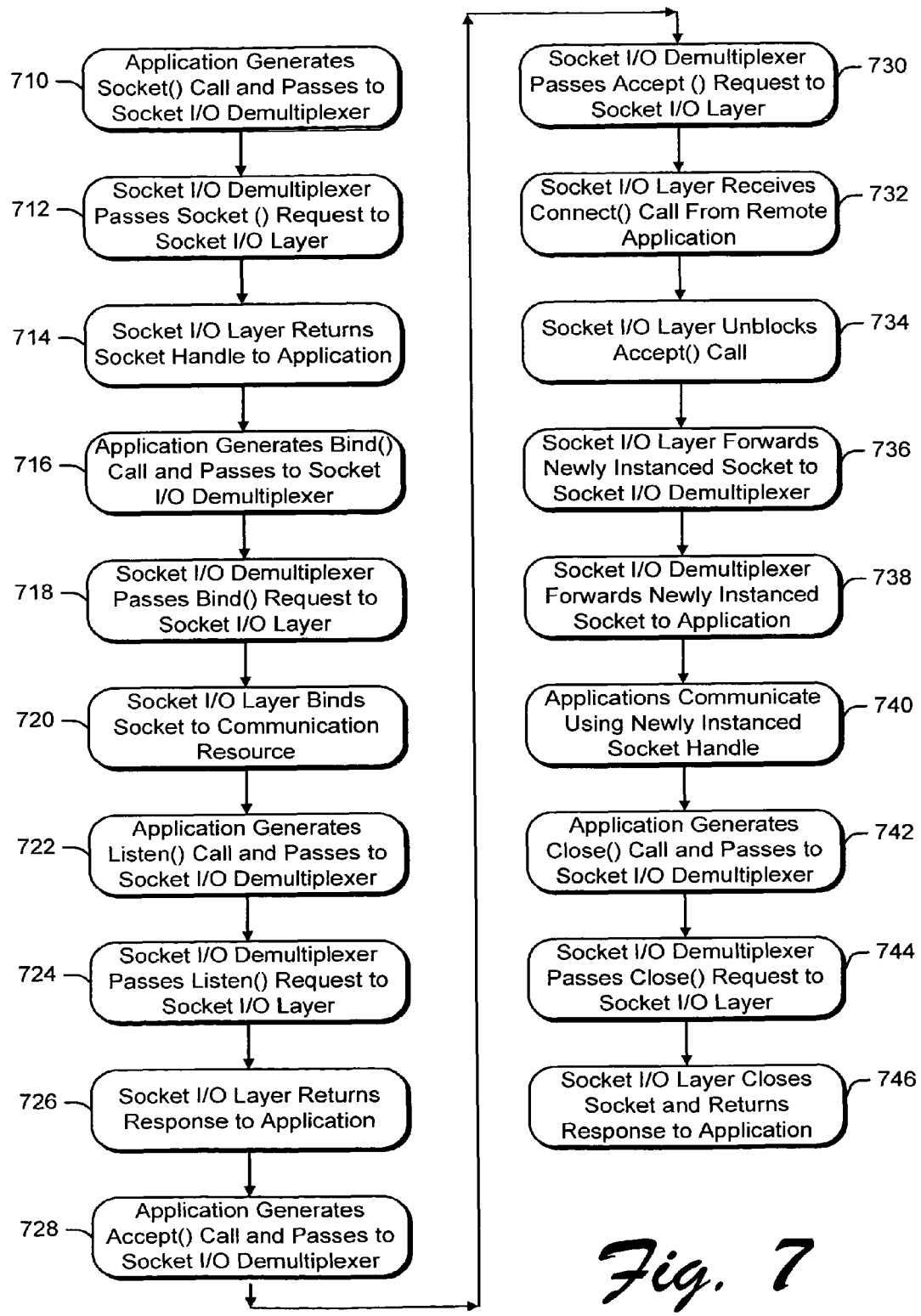
FIG. 7 is a flowchart that illustrates a socket I/O sequence for a circumstance in which a main processor acts as a communication server for an external application.

FIGS. 7-10 are flowcharts that illustrate the use of proxy sockets in multiprocessor communication. Specifically, FIG. 7 is a flowchart that illustrates a socket I/O sequence for a circumstance in which the main processor 310 acts as a communication server for an external application. In this circumstance the main processor uses its own communication resources (i.e., socket I/O API 320 and stack 322) to communicate with external objects. The operations of FIG. 7 will be described with reference to the multiprocessor communication architecture described in FIG. 3, but the particular configuration is not critical.

At operation 710 the application layer 314 generates a socket( ) call and passes the socket( ) call to the sockets I/O demultiplexer 318. The sockets I/O demultiplexer 318 receives the socket( ) call and passes the call to the selected communication module. In this circumstance the master module is the selected communication resource, so at operation 712 the sockets I/O demultiplexer 318 passes the socket( ) request to the socket I/O layer API 320, which returns a handle to the newly-instanced primary socket object (operation 714).

At operation 716 the application layer 314 generates a bind( ) request and passes the bind( ) request to the sockets I/O demultiplexer 318, which in turn passes the bind( ) request to the socket I/O layer API 320 (operation 718). At operation 720 the socket I/O layer API 320 binds the newly-instanced socket handle to a communication resource.

At operation 722 the application layer 314 generates a listen( ) call to convert the newly-instanced socket handle into a listening socket, and passes the listen( ) call to the sockets I/O demultiplexer 318, which in turn passes the listen( ) call to the socket I/O layer API 320. The socket I/O layer API 320 converts the newly-instanced socket handle into a listening socket and sends a reply to the application layer 314 (operation 726). At operation 728 the application layer 314 generates an accept( ) call and passes the accept( ) call to the sockets I/O demultiplexer 318, which passes the accept( ) call to the socket I/O layer API 320. The socket I/O layer API 320 configures the newly-instanced socket handle to accept an incoming connection request from a remote application. In an exemplary implementation, the accept( ) call may be implemented as a blocking call, such that the process or thread waits for an incoming (or inbound) connection requests call from a remote application.

At operation 732 the socket I/O layer API 320 receives a connect request from a remote application. At operation 734 the socket I/O layer API 320 unblocks the accept wait, and at operation 736 the socket I/O layer API 320 forwards a newly-instanced socket handle to the socket I/O demultiplexer 318, which in turn forwards the newly-instanced socket handle to the application layer 314 (operation 738).

At operation 740 the remote application communicates with the application layer 314 using the newly-instanced socket handle. When the communication session is finished, the application layer 314 generates a close( ) call (operation 742) to close the socket created in step 736 and the socket I/O demultiplexer passes the close( ) to the sockets I/O demultiplexer 318 (operation 744), which in turn passes the close( ) call to the socket I/O API 320. At operation 746 the socket I/O API 320 closes the socket instanced in step 736 for send and receive operations and returns a response to the application layer 314.

Figure 8A:
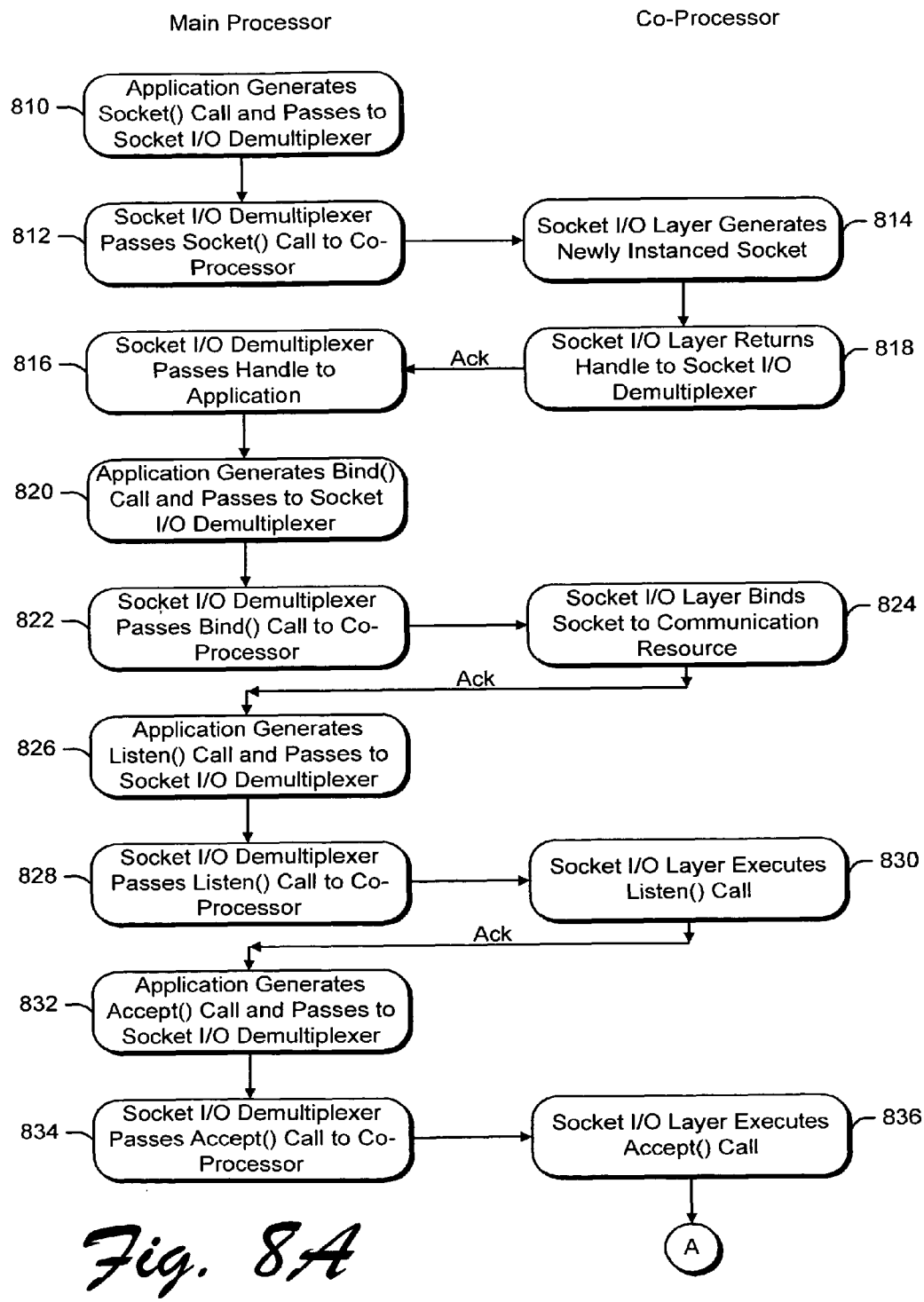
FIGS. 8A-8B are a flowchart illustrating an exemplary socket I/O sequence for multiprocessor communication in which the main processor acts as a communication server for a remote application, but communicates using proxy sockets managed by the main processor that has real socket equivalent managed by the co-processor.
Figure 8B:
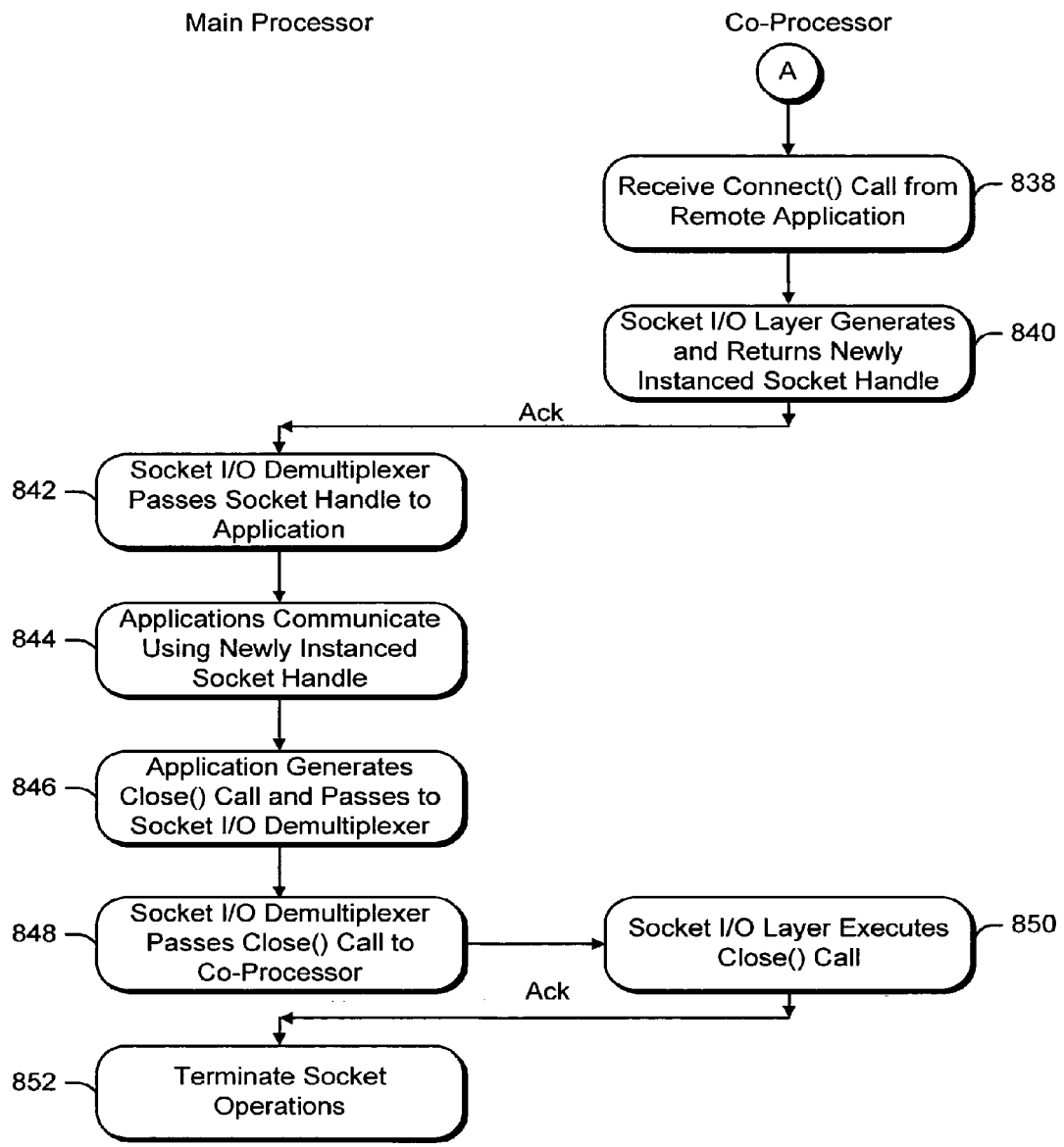

FIGS. 8A-8B are a flowchart illustrating an exemplary socket I/O sequence for multiprocessor communication in which the main processor 310 acts as a communication server for a remote application, but communicates using a proxy socket managed by the main processor 310 which as real socket equivalent managed by the co-processor 350. The operations of FIG. 8 will be described with reference to the multiprocessor communication architecture described in FIG. 3, but the particular configuration is not critical.

At operation 810 an application 314 generates a socket( ) call and passes the socket( ) call to the sockets I/O demultiplexer 318. In an exemplary implementation the socket( ) call specifies that the socket call is to a proxy socket, e.g., by including a SMFC flag in a "protocol" formal parameter passed with the socket( ) call as described above. The sockets I/O demultiplexer 318 receives the socket( ) call and, at operation 812, passes the socket( ) request to the co-processor 350.

In an exemplary implementation the sockets I/O demultiplexer 318 passes various socket calls to the co-processor 350 via a shared memory function call (SMFC). Accordingly, the socket( ) call is passed to the proxy/socket mirror module 324, which passes the socket( ) call to a shared memory driver 326. The shared memory driver 326 maintains a communication path to shared memory driver 362 in the co-processor via shared memory module 370. The shared memory driver 362 retrieves the call from the shared memory module 370 and passes it up its communication stack to the primary/socket master module 360 and to the socket I/O layer 358 for processing. Communication from the co-processor to the main processor follows the reverse path.

At operation 814 the socket I/O layer API 358 generates a newly instanced socket and at operation 818 the socket I/O layer API 358 returns a handle to the newly-instanced socket for send and receive operations to the socket I/O demultiplexer 318 in the main processor. At operation 816 the socket I/O demultiplexer 318 passes the handle to the application 314. At operation 820 the application 314 generates a bind( ) call and passes the bind( ) call to the socket I/O demultiplexer 318. At operation 822 the socket I/O demultiplexer 318 passes the bind( ) call to the co-processor 350. At operation 824 the socket I/O layer API 358 in co-processor 350 binds the newly-instanced socket handle to a communication resource in the co-processor and returns an acknowledgment to the socket I/O demultiplexer 318, which passes the acknowledgment back to the application 314.

At operation 826 the application 314 generates a listen( ) call, which is passed to the socket I/O demultiplexer 318. At operation 828 the socket I/O demultiplexer 318 passes the listen( ) call to the co-processor 350. At operation 830 the socket I/O layer API 358 executes the listen( ) call and returns an acknowledgment to the socket I/O demultiplexer 318, which passes the acknowledgment back to the application 314.

At operation 832 the application generates an accept( ) call, which is passed to the socket I/O demultiplexer 318. At operation 834 the accept( ) call is passed to the co-processor 350. At operation 836 the socket I/O API 358 executes the accept( ) call, which places the proxy socket implemented at the co-processor into a state that can accept a connect-request from a remote application. In an exemplary implementation an accept( ) call may be implemented as a blocking call. At operation 838 the newly-instanced socket receives a connect request from a remote application. At operation 840 the socket I/O API 358 returns the newly instanced socket handle to the application 314 in main processor 310.

At operation 844 the application 314 in main processor communicates with the remote application that invoked the connect( ) call over the communication path via the proxy (or managed) socket that has equivalent of real socket instantiated in co-processor 350. When the communication session is finished the application 314 passes a close( ) call to the socket I/O demultiplexer 318 operation 846. At operation 848 the socket I/O demultiplexer passes the close( ) call to the co-processor 350. At operation 850 the socket I/O API 358 executes the socket close call to close the real socket instance implemented in co-processor 350 at operation 840, and passes an acknowledgment back to the application 314, which terminates socket operations over the proxy socket at operation 852.

Figure 9A:
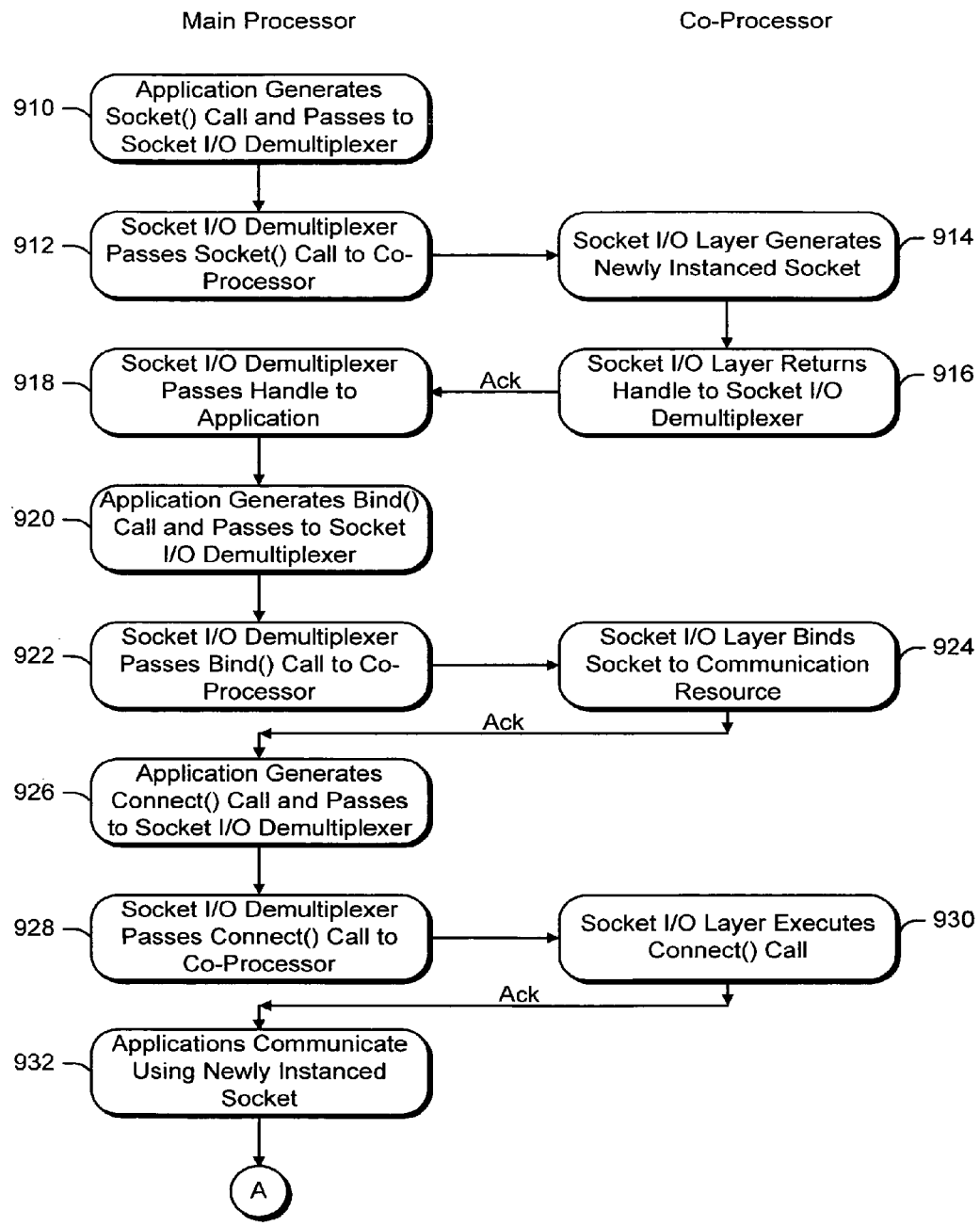
FIGS. 9A-9B are a flowchart illustrating an exemplary socket I/O sequence for multiprocessor communication in which the main processor acts as a communication client for a remote application, and communicates using a proxy socket managed by the co-processor.
Figure 9B:
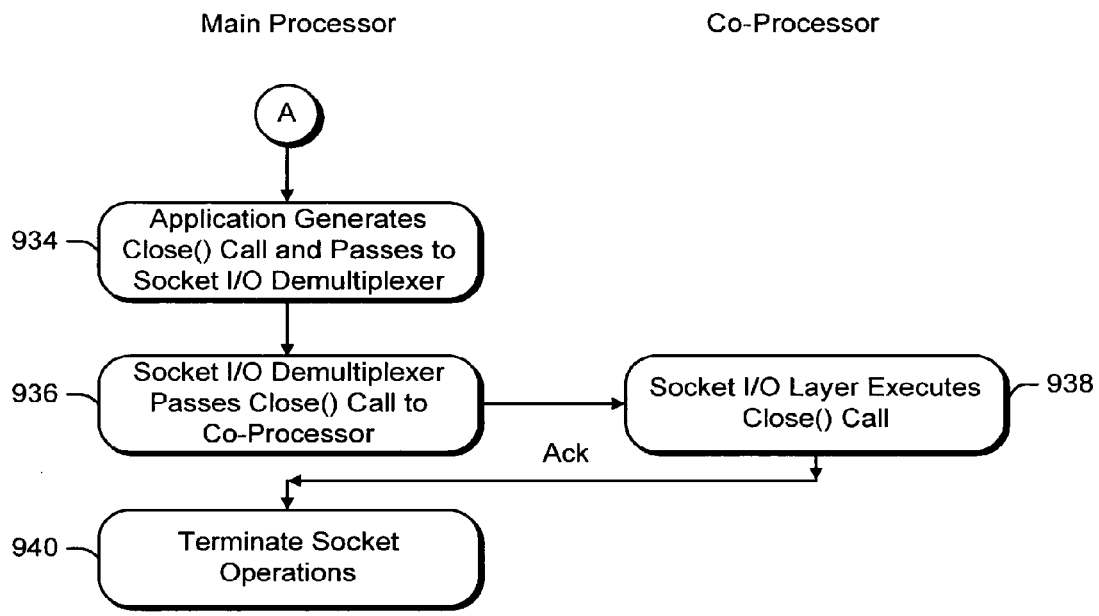

FIGS. 9A-9B are a flowchart illustrating an exemplary socket I/O sequence for multiprocessor communication in which the main processor 310 acts as a communication client for a remote application, and communicates using a proxy socket managed by the main processor 310 which has equivalent real socket that is managed by the co-processor 350. The operations of FIG. 9 will be described with reference to the multiprocessor communication architecture described in FIG. 3, but the particular configuration is not critical.

Operations 910-924 involve opening and binding a proxy socket, and may be implemented as described in operations 810-824. For brevity and clarity, these operations will not be repeated in detail.

At operation 926 the application 314 generates a connect( ) call and passes the connect( ) call to the socket I/O demultiplexer 318. At operation 928 the socket I/O demultiplexer 318 passes the connect request to the co-processor 350. At operation 930 the socket I/O API 358 executes the connect( ) call and sends an acknowledgment back to the socket I/O demultiplexer 318.

At operation 932 the applications communicate using the newly instanced socket. When the communication session is finished the application 314 generates a close( ) call and passes the close( ) call to the socket I/O demultiplexer 318. At operation 936 the socket I/O demultiplexer 318 passes the close( ) call to the co-processor. At operation 938 the socket I/O API 358 executes the close( ) call to close the real socket instanced in operation 914 in the co-processor 350 and returns an acknowledgment back to the application 314, which terminates socket operations over the proxy socket at operation 940.

In another implementation an application 314 on main processor 310 may communicate with an application 354 on co-processor 350. This may be implemented using the operations illustrated in FIGS. 8A-8B with minor changes. In operation 820 the application sends a bind( ) request to bind the communication resource to a local address on the co-processor (i.e., a loopback address). When the bind( ) call in operation 820 is executed, it enables a communication path between the application 314 on the main processor and an application 354 on the co-processor. The application 354 on the co-processor 350 creates and binds a socket to a loopback address to enable the communications path. In an exemplary implementation the loopback network interface is assigned IP address of 127.0.0.1 in TCP/IP network stack's network layer. Remaining communication operations can be implemented as described in FIGS. 8A-8B.

The system architecture and techniques described herein enable multiprocessor communication using proxy sockets. Applications on a first processor can communicate with remote applications using communication resources from a second processor. The remote application can be external to both processors, or can execute on the second processor such that communication takes place using a private loopback address for extra security instead of using existing public address assigned real socket instanced in second processor.

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A method of computing, comprising:
receiving, at a first processor, a request to open a communication resource for communicating with a device external to the first processor, wherein the request includes a proxy flag that identifies a first communication resource managed by the first processor or a second communication resource managed by a second processor;
demultiplexer module operable at the first processor for managing inter-processor communication between the first processor and the second processor, for selecting one of the first communication resource or the second communication resource based on information contained in the proxy flag; and mapping the request to a selected communication resource.

2. The method of claim 1, wherein mapping the request to the selected communication resource comprises instantiating a first data table that includes a pointer to an entry point for communication operations with the selected communication resource.

3. The method of claim 2, further comprising setting, in the first data table, a data field that indicates the value of the proxy flag.

4. The method of claim 3, further comprising opening the selected communication resource.

5. The method of claim 4, further comprising returning a descriptor the selected communication resource.

6. The method of claim 5, further comprising:
receiving a communication request for further communication operations, wherein the communication request identifies the selected communication resource; and
sending the communication request to the selected communication resource.

7. The method of claim 1, wherein selecting one of the first communication resource or the second communication resource based on information contained in the proxy flag further comprises determining whether at least one of the first communication resource or the second resource is accepting communication requests.

8. The method of claim 1, wherein the proxy flag is received in a shared memory function call parameter.

9. A multiprocessor computer system, comprising:
a first computer processor operable to manage a first communication resource;
a second computer processor operable to manage a second communication resource and to communicate with the first computer processor; and
a demultiplexer device operable at the first computer processor to manage inter-processor communication between the first computer processor and the second computer processor, to receive a request to open a communication resource for communicating with a device external to the first computer processor, wherein the request includes a proxy flag that identifies a first communication resource managed by the first computer processor or a second communication resource managed by the second computer processor;
to select one of the first communication resource or the second communication resource based on information contained in the proxy flag; and to map the request to a selected communication resource.

10. The computer system of claim 9, wherein mapping the request to the selected communication resource comprises instantiating a first data table that includes a pointer to an entry point for communication operations with the selected communication resource.

11. The computer system of claim 10, wherein the demultiplexer module device is further adapted to set, in the first data table, a data field that indicates the value of the proxy flag.

12. The computer system of claim 11, wherein the demultiplexer module device is further adapted to open the selected communication resource.

13. The computer system of claim 10, wherein the demultiplexer module device is further adapted to return a descriptor for the selected communication resource.

14. The computer system of claim 13, wherein the demultiplexer module device is further adapted to receive a communication request for further communication operations, wherein the communication request identifies the selected communication resource; and to send the communication request to the selected communication resource.

15. The computer system of claim 9, wherein selecting one of the first communication resource or the second communication resource based on information contained in the proxy flag further comprises determining whether at least one of the first communication resource or the second resource is accepting communication requests.

16. The computer system of claim 9, wherein the proxy flag is received in a shared memory function call parameter.

17. A non-transitory machine-readable medium that stores machine-readable instructions executable by a first processor to perform multiprocessor communication, the non-transitory machine-readable medium comprising:

machine-readable instructions that, when executed by the first processor, receive, at the first processor, a request to open a communication resource for communicating with a device external to the first processor, wherein the request includes a proxy flag that identifies a first communication resource managed by the first processor or a second communication resource managed by a second processor;

machine-readable instructions that, when executed by the first processor, to have a demultiplexer module operable at the first processor to managed inter-processor communication between the first processor and the second processor and select one of the first communication resource or the second communication resource based on information contained in the proxy flag; and machine-readable instructions that, when executed by the first processor, map the request to is selected communication resource.

18. The non-transitory machine-readable medium of claim 17, wherein the machine-readable instructions that, when executed by the first processor, select one of the first communication resource or the second communication resource based on information contained in the proxy flag comprise machine-readable instructions that, when executed by the first processor, determine whether at least one of the first communication resource or the second resource is accepting communication requests.

19. The non-transitory machine-readable medium of claim 17, wherein the proxy flag is received in a shared memory function call parameter.

20. The non-transitory machine-readable medium of claim 17, wherein the machine-readable instructions that, when executed by the first processor, map the request to the selected communication resource comprise machine-readable instructions that, when executed by the first processor, instantiate a first data table that includes a pointer to an entry point for communication operations with the selected communication resource.

* * * * *

UNITED STATES PATENT AND TRADEMARK OFFICE
CERTIFICATE OF CORRECTION

PATENT NO.        : 8,650,302 B2
APPLICATION NO.   : 13/232379
DATED             : February 11, 2014
INVENTOR(S)       : Shin et al.

It is certified that error appears in the above-identified patent and that said Letters Patent is hereby corrected as shown below:

In the Claims

Column 12, line 28, in Claim 5, before "the" insert -- to --.

Column 14, line 12, in Claim 17, delete "is" and insert -- a --, therefor.

Signed and Sealed this
Tenth Day of June, 2014

Michelle K. Lee
*Deputy Director of the United States Patent and Trademark Office*